July 16, 1935.  F. DARDIN ET AL  2,008,350
ABSORPTION REFRIGERATING APPARATUS
Filed Jan. 10, 1934
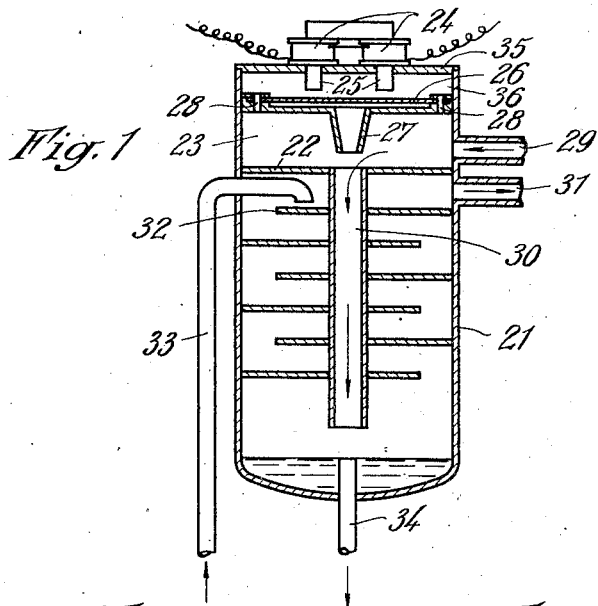
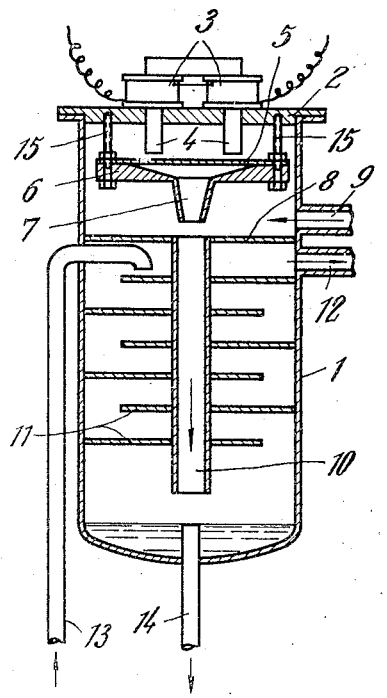
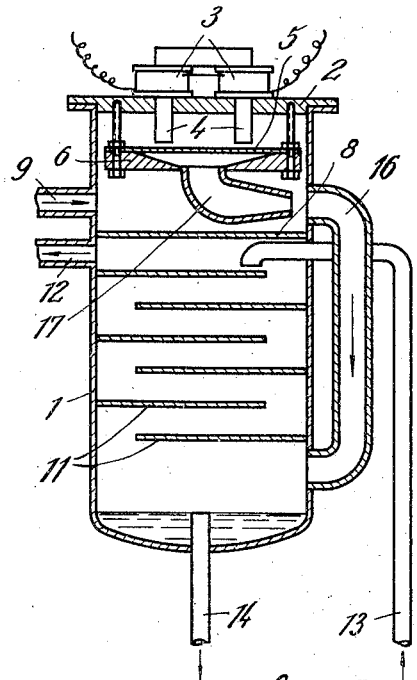
Inventors:
Franz Dardin
Edmund Altenkirch
By Robb & Robb
Attorneys Patented July 16, 1935

2,008,350

UNITED STATES PATENT OFFICE 2,008,350

ABSORPTION REFRIGERATING APPARATUS

Franz Dardin, Berlin-Siemensstadt, and Edmund Altenkirch, Neuenhagen, near Berlin, Germany, assignors to Siemens-Schuckertwerke Aktiengesellschaft, Berlin-Siemensstadt, Germany, a corporation of Germany Application January 10, 1934, Serial No. 705,998 In Germany January 19, 1933

5 Claims. (Cl. 62—119.5)

Our invention relates to absorption refrigerating apparatus operating with a pressure balancing auxiliary gas circulated in the evaporator and absorber, and more particularly to an electromagnetic gas pump therefor.

It is well known in absorption refrigerating apparatus of the intermittent type to circulate in the evaporator and absorber a pressure balancing inert auxiliary gas. The circulation of the inert gas may be created in various ways; for instance by means of a diaphragm arranged in the gas space and set into vibration by the aid of an electromagnet. This particular device for the circulation of an inert gas is known per se. For further consideration of this type of device in general and its operation reference may be had to the patent to P. Schall et al., No. 1,956,402, dated April 24, 1934. The present invention relates to an improvement of a device of the above-indicated character which consists in a particularly favorable arrangement of the oscillating diaphragm which renders at the same time its action entirely independent of the pressure prevailing in the gas space. To this end, the oscillating diaphragm is so arranged in the gas space that no appreciable difference in pressure may exist on the sides of the diaphragm. In this case, the oscillating diaphragm is preferably disposed below the detachable cover of a vertical absorption vessel.

In the accompanying drawing which shows the preferred embodiment of our invention, Fig. 1 is a vertical sectional view of an absorber associated with an electromagnetic gas pump improved according to our invention, and Figs. 2 and 3 disclose vertical sectional views of modifications of our improved device.

Referring to Fig. 1, 21 denotes the casing of the vertically arranged absorber, 22 a wall spanning the absorber which separates the absorption chamber so as to form in the upper part thereof a chamber 23. On the top wall or cover 35 of the absorber there is mounted an electromagnet whose winding 24 is arranged outside of the chamber 36 and whose limbs 25 project into the same through the top wall or cover 35. An oscillating magnetizable diaphragm mounted on an annular support is arranged below the limbs of the electromagnet 25. If this diaphragm is caused to vibrate, for instance, by energizing the winding 24 of the electromagnet with alternating current the gas particles contained in the chamber 23 are drawn in from different directions through a tapered tube 27 placed beneath the diaphragm. Upon the downward movement of the diaphragm 26 these gas particles are ejected from the space beneath the diaphragm 26 through the tapered tube 27 in the vertical direction. In this manner the gas or gas mixture supplied to the chamber 23 through the conduit 29 then passes in a unidirectional flow into the conduit 30 which extends centrally through the absorption chamber. The conduit 30 is in open communication with the lower part of this chamber and ends below the distributing baffle plates 32 which are so arranged as to cause the liquid and the gaseous media to follow a tortuous path. The weak absorption solution is supplied to the upper part of the absorber through a liquid conduit 33. The gas mixture flowing upwardly through the absorption chamber in contact with the absorption liquid is carried off through a gas conduit 31. A liquid conduit 34 which forms an overflow in the lower part of the absorber carries off the strong absorption solution from the absorber.

The annular support for the oscillating diaphragm built integral with the inner wall of the absorber 21 is provided with perforations 28 at several points of its periphery which are arranged in registry with similar perforations of the diaphragm 26. Consequently, the gas mixture contained in the chamber 23 may freely pass into the space 36 through the perforations 28.

This is then of particular importance if a relatively high pressure prevails in the chamber 23, particularly when greater changes in pressure in the system occur. Since the chamber 23 communicates with the space 36 the diaphragm 26 will oscillate without any hinderance independently of the changes in pressure prevailing in the refrigerating system.

The diaphragm 26 must not necessarily be perforated. On the contrary, the diameter of the diaphragm might be made so small without departing from the scope and spirit of the invention that the perforations 28 lie outside of the periphery of the diaphragm without thereby impairing the action in any way.

In the modification shown in Fig. 2, the portion of the cover 1 through which the limbs of the magnet 3, 4 pass is preferably made of a magnetically poor conducting material. The material may, for instance, be a steel alloy containing a certain amount of chrome and which in connection with the mechanical strength and resistance to chemical reactions has the advantage of being a poor magnetical conductor. The magnetizable diaphragm 3 is so arranged with respect to the poles 4 of the electromagnet that upon energization of the latter the diaphragm is caused to vibrate. The diaphragm 5 is held in position by a support 6 which ends into a tapered tube 7. The support 6 is secured to the cover 2 by means of bolts 15. A gas supply conduit 9 enters the space containing the support 6. The space is separated from the absorption chamber of the vessel 1 by an intermediate wall 8, which is provided with an aperture in the central portion thereof to which the vertical pipe 10 is connected. The gas pipe 10 ends at the lower part of the absorption chamber below the baffle plates 11 arranged therein so as to cause the liquid and the gaseous media to follow a tortuous path. A gas conduit 12 extends from the upper part of the absorption chamber to the evaporator (not shown). The weak absorption solution is supplied to the upper part of the absorber by means of a liquid conduit 13. A second liquid conduit 14 which forms in the lower part of the absorber an overflow carries off the strong absorption solution to the generator (not shown).

The operation of the absorption apparatus is as follows: A mixture of vaporous refrigerant and inert gas coming from the evaporator (not shown) passes into the space of the absorber above the intermediate wall 8 (Fig. 2) through the conduit 9. Here a unidirectional gas current is created by the electromagnetically operated oscillating diaphragm 5 which upon its upward movement, so to say, attracts the gas particles from different directions through the tapered tube 7 and expels them in the vertical direction upon its downward movement, thus causing the gas to flow through the centrally mounted conduit 10 in the direction of the arrow and then in the absorption chamber in the upward direction between the baffle plates. The gas leaves the absorber at the upper part thereof through a conduit 12 and passes into the evaporator.

In the above-described arrangement it is possible, on the one hand, to arrange the oscillating diaphragm and the electromagnet for operating the same at a point of the gas circulating system which is easily accessible, viz., at the uppermost part of the absorber and to create nevertheless a current of gas mixture in such a manner that the gas in the absorption chamber flows in counterflow to the absorption solution. However, on the other hand, the advantage is obtained as is the case in the arrangement disclosed in Fig. 1 in that an appreciable difference in pressure cannot occur owing to the fact that both sides of the diaphragm 5 are in open communication with each other. Since the diaphragm support is secured to the removable cover of the absorber the same may be, if desired, removed together with the oscillating diaphragm in a simple manner.

In Fig. 3 is illustrated a modification which differs in the first place from that of Fig. 2 in that the tapered tube 17 integral with the diaphragm support does not extend vertically in the downward direction but it is bent laterally and in the second place in that the conduit 16 opposite to the mouth of the tube 17 leaves the absorber at the upper part and enters the same at the lower part thereof. Further, the intermediate wall 8 completely separates the absorption chamber from the space in which the diaphragm support 6 and the tapered tube 17 are arranged. The operation of the device is, however, substantially the same as that of the device shown in Fig. 2.

We claim as our invention:
1. A valveless electromagnetic gas pump in combination with an absorber of an absorption refrigerating system of the continuous type operating with inert gas, comprising a gas chamber hermetically sealed against the outside, a diaphragm arranged in said chamber, a support for said diaphragm having a central aperture for drawing in and forcing out gas from and into said chamber upon the energization of said pump, both sides of said diaphragm being in open communication so as to equalize the pressure at both sides thereof.

2. A valveless electromagnetic gas pump in combination with an absorber of an absorption refrigerating system of the continuous type operating with inert gas, comprising a gas chamber hermetically sealed against the outside, a nozzle enclosed in said gas chamber to direct said gaseous agent in a predetermined direction of circulation upon the energization of said pump, a peripherally perforated support integral with said nozzle and spanning said chamber, and a diaphragm associated with said support and having perforations in registry with the perforations of said support so as to equalize the pressure at both sides of said diaphragm.

3. A valveless electromagnetic gas pump in combination with an absorber of an absorption refrigerating system of the continuous type operating with inert gas, comprising a gas chamber hermetically sealed against the outside, a nozzle enclosed in said gas chamber to direct said gaseous agent in a predetermined direction of circulation upon the energization of said pump, a peripherally perforated support integral with said nozzle and spanning said chamber, a diaphragm associated with said support and having perforations in registry with the perforations of said support so as to equalize the pressure at both sides of said diaphragm, said pump having the magnet poles extending inside said gas chamber and exciting windings exteriorly thereof.

4. A valveless electromagnetic gas pump in combination with an absorber of an absorption refrigerating system of the continuous type operating with inert gas, comprising a gas chamber hermetically sealed against the outside, a diaphragm arranged in said chamber, a peripherally perforated support for said diaphragm so as to equalize the pressure at both sides of the diaphragm and having a central aperture for drawing in and forcing out gas from and into said chamber upon the energization of said pump.

5. In a valveless electromagnetic gas pump in combination with an absorber of an absorption refrigerating system of the continuous type operating with inert gas, said absorber being provided at the upper part thereof with a gas chamber and a detachable cover for hermetically sealing said chamber against the outside, a nozzle enclosed in said gas chamber to direct the gaseous agent in a predetermined direction of circulation upon the energization of said pump, a support integral with said nozzle, a diaphragm associated with said support, and electromagnetic means comprising magnetic poles extending inside said gas chamber and exciting windings exteriorly thereof, said electromagnetic gas pump being rigidly fixed to said cover.

FRANZ DARDIN.
EDMUND ALTENKIRCH.